US012595719B2

(12) United States Patent
Ramakrishnan et al.

(10) Patent No.: US 12,595,719 B2
(45) Date of Patent: Apr. 7, 2026

(54) EFFICIENT SURFACE AND DOWNHOLE HEATING OF INJECTED CARBON DIOXIDE

(71) Applicant: SCHLUMBERGER TECHNOLOGY CORPORATION, Sugar Land, TX (US)

(72) Inventors: Terizhandur S. Ramakrishnan, Cambridge, MA (US); Ozgur Senel, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 30 days.

(21) Appl. No.: 18/698,099

(22) PCT Filed: Oct. 7, 2022

(86) PCT No.: PCT/US2022/045964
§ 371 (c)(1),
(2) Date: Apr. 3, 2024

(87) PCT Pub. No.: WO2023/059840
PCT Pub. Date: Apr. 13, 2023

(65) Prior Publication Data
US 2024/0410256 A1     Dec. 12, 2024

Related U.S. Application Data

(60) Provisional application No. 63/253,819, filed on Oct. 8, 2021.

(51) Int. Cl.
E21B 41/00     (2006.01)
E21B 36/00     (2006.01)
E21B 36/04     (2006.01)

(52) U.S. Cl.
CPC .......... *E21B 41/0064* (2013.01); *E21B 36/00* (2013.01); *E21B 36/006* (2013.01); *E21B 36/04* (2013.01); *Y02C 20/40* (2020.08)

(58) Field of Classification Search
CPC ...... E21B 41/0064; E21B 36/00; E21B 36/04; E21B 36/006
See application file for complete search history.

(56) References Cited

U.S. PATENT DOCUMENTS 4,037,655 A     7/1977 Carpenter
4,593,763 A     6/1986 Burke
(Continued)

FOREIGN PATENT DOCUMENTS

AU     2010339952 A1 *   7/2012   ............. E21B 43/40
KR     20110074056 A     6/2011
(Continued)

OTHER PUBLICATIONS

International Search Report and Written Opinion issued in International Patent Application No. PCT/US2022/045964 on Feb. 14, 2023; 10 pages.
(Continued)

*Primary Examiner* — Frederick L Lagman
(74) *Attorney, Agent, or Firm* — Jeffrey D. Frantz

(57) ABSTRACT

A process for injection of $CO_2$ in high-temperature reservoirs, where preheating of the injected stream is necessary. The process comprises producing hot water from a distant well, using the produced hot water in a surface heat exchanger for heating $CO_2$. Alternatively, the produced hot water may be used in a wellbore heat exchanger to heat the incoming $CO_2$ as a counter-current heat exchanger. When the available CO2 is substantially cooler than the ambient, preheating via solar thermal is desirable prior to feeding to the heat exchanger.

16 Claims, 3 Drawing Sheets

(56)         References Cited

U.S. PATENT DOCUMENTS

| 7,090,013 | B2 * | 8/2006 | Wellington | ......... E21B 41/0064 |
| | | | | 208/213 |
| 8,549,857 | B2 * | 10/2013 | Papile | ....................... F03G 7/04 |
| | | | | 60/645 |
| 2010/0258265 | A1 | 10/2010 | Karanikas et al. | |
| 2012/0073799 | A1 | 3/2012 | Kim et al. | |
| 2018/0171768 | A1 * | 6/2018 | Tiffany, III | ............... C02F 9/00 |
| 2020/0284945 | A1 * | 9/2020 | Khan | ....................... G08B 5/22 |
| 2021/0140684 | A1 | 5/2021 | Younes et al. | |

FOREIGN PATENT DOCUMENTS

| KR | 20120058181 | A | * | 6/2012 | ................. F25J 1/00 |
| KR | 20200061462 | A | | 6/2020 | |
| KR | 20200112522 | A | | 10/2020 | |
| RU | 2093444 | C1 | * | 10/1997 | ......... E21B 41/0064 |

OTHER PUBLICATIONS

International Preliminary Report on Patentability of International Patent Application No. PCT/US2022/045964 dated Apr. 18, 2024, 7 pages.

* cited by examiner

Table 1: Temperature Rise in Injected $CO_2$ by Hot Water Injection from Numerical Simulation

| Trajectory | $T_{Ct}$, °C | $q_c$, m³ d⁻¹(std.) | $T_{wh}$ °C | $q_w$, m³ d⁻¹ | Injection Depth, m | $T_{Cb}$, °C |
|---|---|---|---|---|---|---|
| Vertical | 15.56 | 1472.48 | 85 | 0.00 | - | 48.33 |
| Vertical | 15.56 | 1472.48 | 85 | 357.21 | 304.8 | 61.67 |
| Vertical | 15.56 | 1472.48 | 85 | 357.21 | 609.6 | 62.22 |
| Vertical | 15.56 | 1472.48 | 85 | 357.21 | 914.4 | 62.78 |
| Vertical | 15.56 | 1472.48 | 85 | 357.21 | 1828.8 | 64.44 |

Table 2: Properties Used for Numerical Simulation to Assess Temperature Rise

| Material | $C_p$, kJ kg⁻¹ K⁻¹ | Thermal Conductivity, J m⁻¹ s⁻¹ K⁻¹ | Density, kgm⁻³ |
|---|---|---|---|
| Tubulars | 0.5 | 47.968 | 7840 |
| Cement | 2.5 | 2.998 | 2100 |
| Sandstone | 1.0 | 4.997 | 2500 |
| Shale | 1.0 | 1.998 | 2500 |
| Water | 4.2 | 0.596 | 1080 |
| $CO_2$ | 1.85 | 0.112 | 954 |

FIG. 3

EFFICIENT SURFACE AND DOWNHOLE HEATING OF INJECTED CARBON DIOXIDE

CROSS-REFERENCE TO RELATED APPLICATIONS

The present application is a national stage entry under 35 U.S.C § 371 of International Application No. PCT/US2022/045964, dated Oct. 7, 2022, which claims priority to U.S. Provisional Application No. 63/253,819, dated Oct. 8, 2021, the entirety of which is incorporated by reference.

FIELD OF THE DISCLOSURE

Aspects of the disclosure relate to using carbon dioxide in various industrial applications. More specifically, aspects of the disclosure relate to providing an efficient surface and downhole heating of carbon dioxide injected into a medium.

BACKGROUND

Given the concerns of climate change, $CO_2$ storage in deep aquifers is likely to be necessary intermediary step to alleviate temperature rise. In many instances, cold $CO_2$ in liquid form may be available at the well site, particularly when transportation criteria dictate the means of delivery. Under such circumstances, $CO_2$ without surface heating may be undesirably cold, and will increase the risk of cement debonding from either the casing or the formation, causing concerns of lack of well-bore integrity. Failed well-bore integrity is a cause for concern due to potential upward migration of $CO_2$. Surface heating of cold $CO_2$ prior to injection through solar, thermal or electrical sources is an expensive option, imposing additional penalty due to energy consumption and prohibitive capital costs. It is therefore the purpose of this disclosure to provide natural heating methods by using the available hot water in an efficient heat exchange cycle. Additional benefits of using this method includes avoiding adverse pressure build-up in order to sustain injectivity.

Carbon storage usually involves purifying a stream of $CO_2$, dehydrating it, and then compressing for pumping into deep aquifers. The desirable depths of such injection ranges from roughly 1000-3000 m although each specific case will have to be analyzed for suitable depth intervals.

Common practice is to compress the purified incoming stream in stages with intercooling. The resulting $CO_2$ stream is elevated above ambient surface temperature and may range from 20-60° C. Further heating of the injection may occur naturally due to geothermal gradient, and the difference between the formation temperature and the injected fluid is expected to be within 20° C. Having a temperature sufficiently close to the formation temperature reduces differential contraction and is likely to preserve well-bore integrity, i.e., $CO_2$ leakage pathways are substantially reduced.

Under some circumstances, the stream of $CO_2$ may be available as a liquid, and at a sufficiently low temperature that at downhole conditions temperature differential may be in excess of 60° C. For example, if the injection site is not directly accessible through pipelines from the source, $CO_2$ may be best transported as a refrigerated liquid. While surface warming of this container may bring the injection temperature to near ambient condition, temperature difference at bottom-hole conditions may still be in excess of 40° C., thus causing differential contraction of the casing, cement, and the formation. Substantial reduction of temperature from the original formation conditions is not desirable unless geomechanical calculations of the composite system indicate that formation and well-bore integrity are unlikely to compromised. Debonding of cement from casing is a risk that is best avoided.

Heating of $CO_2$ prior to injection, while feasible, is punitive. Heating of $CO_2$ to near ambient conditions is best done through surface solar radiation in order to avoid additional $CO_2$ emission, but further heating is needed to bring the injected fluid to within about 15 20° C. prior to contact with the formation. Electric or combustion heating, would reduce carbon credits gained through storage.

A very rough estimate for a particular example may highlight the parasitic emissions for a surface heating installation. For simplicity, let us assume that a 20° C. elevation in the injected fluid stream is desired. We will assume a specific heat Cp of 2 kJ $kg^{-1}$ $K^{-1}$ for $CO_2$ at surface conditions of high-enough pressure and sufficiently low temperature for $CO_2$ to be in liquid state warranting a heater inlet temperature of about 10° C. For a million tonnes of $CO_2$ injected per year, the heat input required is approximately 40 TJ or 975 ML(std.) of natural gas for combustion (we have used 1 TJ≡24.4 ML(std)). For an efficiency of 80%, this volume is increased to 1218 ML(std) of natural gas or about 1154 ML at normal conditions. Roughly, this amounts to 824 t of methane per year, adding an additional 2267 t of $CO_2$ per year that may be required to be stored, not to mention the separation cost of purifying this emitted $CO_2$. With natural gas at $3.5 per 1000 standard cuft, this is an additional cost of $150546 per year. If the $CO_2$ emission cost is $40 a tonne, punitive additional expense is $90680 per year, the total cost amounting to $241226 a year.

There is a need to provide apparatus and methods for the purpose of avoiding this cost. While reducing running costs, the aspects described below have the potential to avoid operational difficulties and circumventing injection pressure-imposed limits.

There is a need to provide an apparatus and methods that easier to operate than conventional apparatus and methods.

There is a further need to provide apparatus and methods that do not have the drawbacks of inopportune economic expenditures discussed above.

There is a still further need to reduce the overall economic costs associated with operations and apparatus described above with conventional tools.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method is disclosed. The method may comprise obtaining a quantity of carbon dioxide for processing and heating the carbon dioxide to a specified temperature. The method may also comprise transferring the heated carbon dioxide to a transfer arrangement and transferring the heated carbon dioxide to an underground reservoir through use of the transfer arrangement.

In another example embodiment, an arrangement is disclosed comprising a storage device for containing a quantity of carbon dioxide and a heating device configured to take at least a portion of the quantity of carbon dioxide and heat the carbon dioxide to a specified temperature. The arrangement may also comprise a control system configured to monitor a process of the heating of the carbon dioxide to the specified temperature and an injection system to inject the heated carbon dioxide into a reservoir.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments.

FIG. 3 provides a first table of temperature rise in injected $CO_2$ by hot water injection while the second table shows properties used for numerical simulation.

Figure 1:
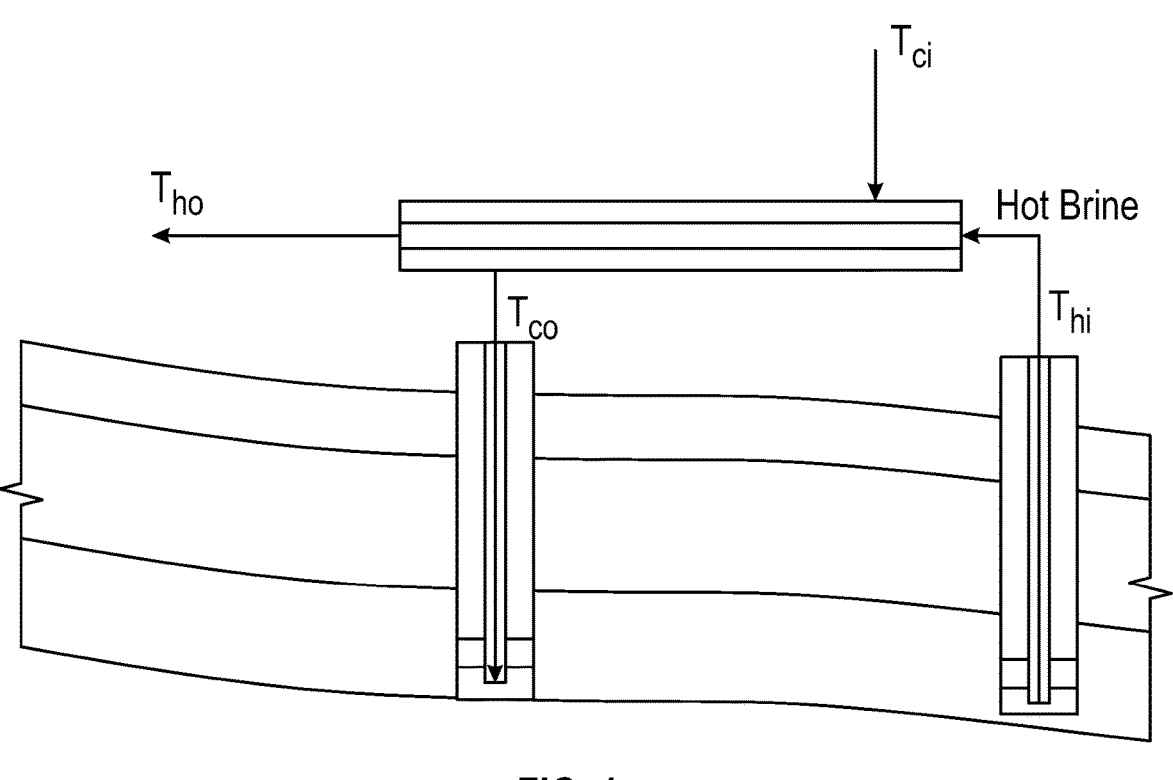
FIG. 1 is a schematic of an example of surface heating.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

A process for injection of $CO_2$ in high-temperature reservoirs, where preheating of the injected stream is necessary. The process comprises producing hot water from a distant well, preferably through an insulated production tubing and using the produced hot water in a surface heat exchanger for heating $CO_2$. The preferred mode is to feed the water in counter-current flow to heat the incoming $CO_2$. When the available $CO_2$ is substantially cooler than the ambient, preheating via solar thermal is desirable prior to feeding to the heat exchanger. Alternatively, and preferably, inject hot water through an insulated tubing in the annulus to an optimal depth, for the hot water to flow upward to the surface. The upward flowing hot water cools by heating the $CO_2$ within the injection tubing. Optimal depth for hot-water injection is chosen based on the desired downhole minimum temperature of $CO_2$ to preserve well-bore integrity, and the cost of completion including insulated tubing cost. Note that integrity must be preserved along a sufficiently long section over which formation seals are present. The exiting colder water from the annulus or from the surface heat exchanger may be disposed through surface utilization, or injected into a distant well.

In another embodiment of the disclosure, a hot water is produced at a temperature $T_b$ bottomhole, and is reduced to $T_{hi}$ at surface. Illustrated by way of example in counter-current flow, this temperature is reduced in a heat exchanger to $T_{ho}$, while heating an inlet stream of cold $CO_2$ from $T_{ci}$ to $T_{co}$. Further heating of $CO_2$ occurs as it traverses down the borehole tubing. Note that $T_{ci}$ may be elevated from the supplied $CO_2$ temperature through low-intensity preheating.

In a still further embodiment, hot water is produced at a temperature $T_b$ bottomhole, and is reduced to $T_{hi}$ at surface. This temperature is reduced in a heat exchanger to $T_{ho}$, through countercurrent flow in annulus of the injection completion. The inlet stream of $CO_2$ is also increased from an inlet temperature of $T_{ci}$ though annular heating. Note that $T_{ci}$ may be elevated from the supplied $CO_2$ temperature through low-intensity preheating. This preheating is denoted as a change from $T_{cim}$ to $T_{cip}$. Wellhead $CO_2$ temperature in this case is $T_{cip}$. Note that the scheme is equally applicable for vertical and deviated wells.

The problem of elevated formation temperature in relation to injected fluid may be taken advantage of if hot water is produced from a distant well and use it to heat the injected $CO_2$. Various options present themselves for heating, circulation, and pressure maintenance via depletion. Possibilities are listed below, and are by no means exhaustive.

Notations are as follows: $T_w$ is for water temperature. $T_C$ is for $CO_2$ temperature. Subscripts c and h are for cold and hot respectively. Since the cold fluid is also $CO_2$, subscripts c or C would have the same implication. Similarly b means bottom, t stands for top, i and o imply inlet and outlet respectively, and f is feed condition at well inlet. If no further heating of cold fluid occurs past the heat exchanger, $T_{co}=T_{cf}$. In countercurrent flow what is feed end for one fluid becomes outlet for the other and vice versa. The surface outlet temperature should be approximately the same as surface top temperature for the injected $CO_2$, since the intervening piping could be short and insulated.

As an illustrative example, specific conditions are assumed for $T_{wb}$ equal to the formation temperature, and $T_{cf}$ the surface feed temperature of $CO_2$.

Ambient heating of a cold stream of $CO_2$ may be carried out by either solar, thermal or radiant heat in buffered storage tanks and finned pipelines. The resulting increase in pressure is likely to reduce compression cost, although the additional savings due to this are not addressed herein. In the example below, it is assumed, that due to ambient heating a chilled cold stream from say $-20°$ C. may be warmed to about $10°$ C., with some variations in seasonal changes corrected through preheating as needed. Preheating could be carried out by solar heating or solar photovoltaic based electrical heating.

In one example, hot water is produced from a production well. As an example, we will assume that for a given injection rate of $CO_2$, the production rate of water will be lowered by the increased viscosity. The assumption is that the reservoir at the initial stage is in hydrostatic equilibrium. Additional reduction in water production will be imposed as a safety factor.

Produced water may be pumped out using an insulated tubing, in order to keep $T_{wt}$ as high as possible, and not substantially lower than $T_{wb}$.

This hot produced water may be used in a surface heat exchanger to heat the incoming $CO_2$.

Alternatively, produced water is then pumped into the annulus of the injection well at the bottom or any other suitable depth. The suitable injection depth is chosen such that the $CO_2$ in the injection tubing has the desired temperature profile. The injected hot water rises up in the annulus transferring heat to the injected $CO_2$. In both cases, the outlet of the brine after heat exchange may then be redirected for either surface utilization or injected into a distant well.

The idea outlined above is demonstrated through sample calculations. While detailed heat transfer simulations will be necessary to compute temperature changes and profiles more precisely for a given well configuration, a good-enough estimate may be obtained from log-mean temperature difference for heat-transfer rate calculations. We also supplement these with numerical results from flow and heat transfer simulations.

In one example, let the injection rate of $CO_2$ be one million tonnes per year into a single well. This is equal to 2.74 Gg d$^{-1}$. For simplicity, the density of this stream downhole is assumed to be 800 kg m$^{-3}$ with a viscosity of 0.07 mPa s. This corresponds roughly to a pressure of 37.5 MPa and a temperature range of 80-90° C. For the same condition, $\mu_w$=0.34 mPa s, and $\rho_w$=985 kg m$^{-3}$. Under 100% efficiency i.e., perfectly insulated production tubing, and ideal heat exchanger, the maximum temperature one may expect to elevate $CO_2$ temperature with this hot water may be calculated. For this estimate, a constant pressure specific heat of 2000 J kg$^{-1}$ K$^{-1}$ for $c_{pC}$ and 4120 J kg$^{-1}$ K$^{-1}$ for $c_{pw}$ Is used.

For a conservative approach, the production index be only half of the injection index. This essentially implies that the pressure drop to sustain in the production well is half of elevation in pressure at the injection well. The mass rate of produced water is $$m_w = \frac{1}{3}m_C \frac{\rho_w}{\rho C}\frac{\mu C}{\mu_w} \tag{1}$$

With the property values stated above, this results in production rate of water of 347 t d$^{-1}$. In oil-field units this is tantamount to 2216 Bbl/day.

Now, the maximum temperature rise of $CO_2$ is:

$$\Delta T_C = -\frac{m_w c_{pw}}{m_C c_{pC}}\Delta T_w \tag{2}$$

For the stated properties we get $$\frac{\Delta T_C}{\Delta T_w} = -0.26 \tag{3}$$

If one is able to lower the water temperature from 85° C. to a temperature of 20° C. Eq. 3 would lead to $T_C$ to rise from 10° C. to a temperature of approximately 27° C. This temperature would be quite adequate for surface injection condition, because additional geothermal heating in injection tubing will also elevate temperature sufficiently close to the original formation temperature of 90° C. that would protect well-bore integrity, or at least maintain integrity above the formation interval across the flow barrier. Under any case, the surface heating load will be substantially reduced. Quite importantly, with this strategy, all of the compression on the surface occurs in liquid form of $CO_2$, while at the well head brine density will stay higher than $CO_2$ density. Note that even at 37.5 MPa, much higher than well-head pressure, density of $CO_2$ at 27° C. is 989 kg m$^{-3}$. If further temperature increase is absolutely necessary, additional heating may be considered. Alternatively, additional hot-water production is an option.

Our tubing calculations show that with insulation, when water or brine is produced at $T_{wb}$=90° C., the surface temperature of water may be above 85° C. Thus, an increase from 10° C. to 27° C. of the feed stream of $CO_2$ is possible. If higher production rate of water is feasible, then we can increase the change in the surface temperature of $CO_2$ proportionately. For surface heating of $CO_2$ stream, a shell and tube heat exchanger may suffice. Using the standard calculation with a heat transfer coefficient determined for water and $CO_2$ using Dittus-Boelter equation, with a log-mean temperature difference driving heat flux, we estimate an area of heat transfer of 26 m$^2$. For the tube diameter of 11.4 cm, we estimate a total length of 72 m for countercurrent flow.

Approximate load reduction is based on the temperature rise achieved to what was specified, i.e., 17/20 or 85%. Cost saving then amounts to $241226×0.85=$205042 of current monetary value. On a 20 y project, with a discount rate minus a commodity pricing rate of 3%, this amounts to a present value of $3.05 million.

A schematic for surface heating is shown in FIG. 1. Bottom-hole temperature is $T_b$. Surface temperature of produced brine is $T_b-\Delta T_{br}$—The cold fluid i.e., $CO_2$ inlet is $T_{ci}$, and the outlet temperature is $T_{co}$. If no further heating of $CO_2$ occurs, this is the well-head temperature for $CO_2$. In the illustrative example discussed above, $T_{ci}=10°$ C., $T_{co}=27°$ C. $T_b=90°$ C., and $\Delta T_{br}=5°$ C.

The surface heat exchanger hot fluid inlet temperature is $T_{hi}=T_b-\Delta T_{br}$. The outlet temperature of the hot fluid is $T_{ho}$. For the example we used, $T_{hi}=85°$ C. and $T_{ho}=20°$ C.

Referring to FIG. 1, hot water is produced at a temperature $T_b$ bottomhole, and is reduced to $T_{hi}$ at surface. Illustrated by way of example in counter-current flow, this temperature is reduced in a heat exchanger to $T_{ho}$, while heating an inlet stream of cold $CO_2$ from $T_{ci}$ to $T_{co}$. Further heating of $CO_2$ occurs as it traverses down the borehole tubing. Note that $T_{ci}$ may be elevated from the available temperature through low-intensity preheating. This is not shown here. Although the illustration is for vertical wells, the logic applies to deviated wells also.

Figure 2:
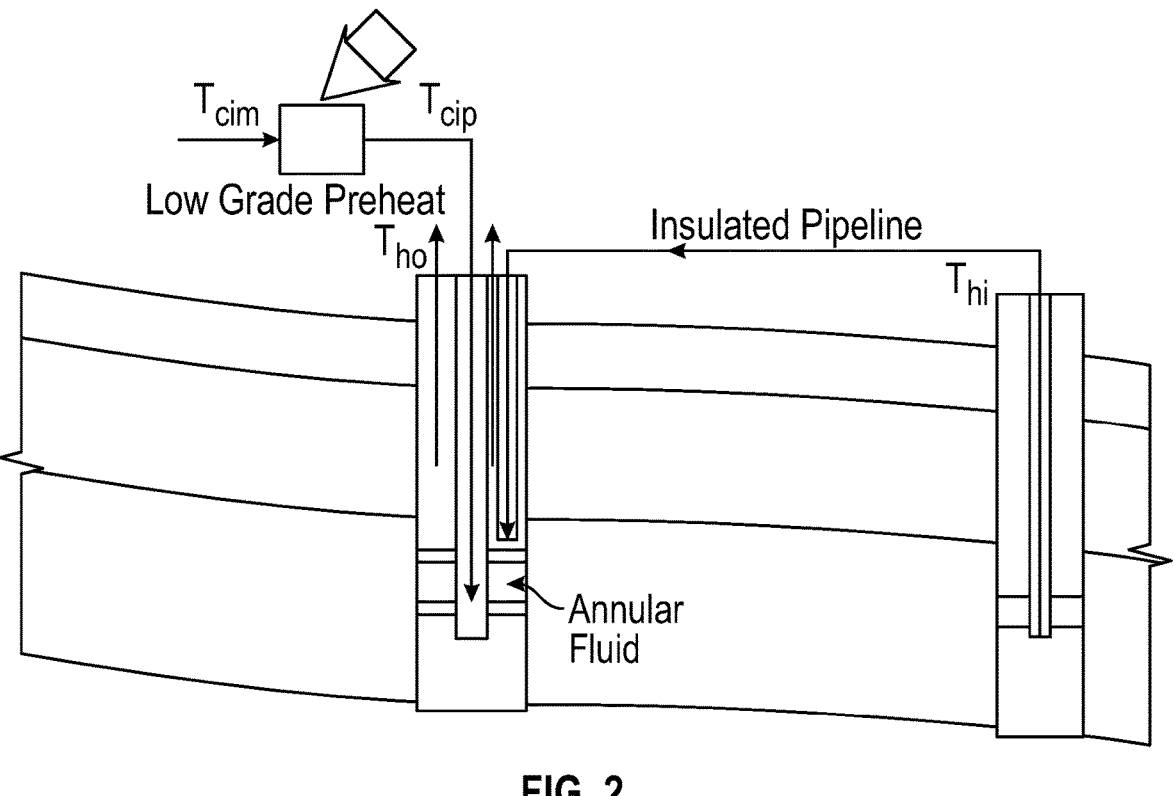
FIG. 2 is a schematic of downhole heating.

An alternative to having the surface infrastructure with large heat exchangers, an injection well itself may be used for providing the requisite surface area. The implementation is illustrated in FIG. 2. The produced water at $T_{hi}$ is then fed into annulus through an insulated tubing that runs to the bottom. The bottom temperature of the hot fluid is less than $T_{hi}$ by about $\Delta T_{br}$, although the precise difference will need to be computed for the specific geometry that differs from produced water completion. Note that the downward flowing brine exchanges heat with the up going brine albeit through insulation, and their flow rates are equal.

Upward flowing brine heats not only the injected $CO_2$, but also the formation, the latter occurring through the casing and the cement. $CO_2$ is preferentially heated for two reasons: (i) thermal conductivity of steel is much larger than formation and cement and (ii) the temperature difference between $CO_2$ and upward flowing brine is larger than that of formation and the brine. These factors overwhelm the increased surface area of casing compared to tubing.

In many instances a solar preheating or a low grade heating may be useful, and allow for $CO_2$ to reach the requisite downhole temperature specification of the injected $CO_2$. This is shown as inlet temperature $T_{cim}$ for preheat and an outlet temperature $T_{cip}$ post surface heating. Preheat is best accomplished through solar radiation or solar photovoltaic electric heating.

An extension to the above configuration is to optimize the extent to which the hot-water tubing is run in the annulus. The exit point of hot water may be optimized considering two separate criteria, the cost of the tubing and the temperature rise of the injected $CO_2$. Although our numerical pipe flow simulations with heat transfer and a geothermal gradient suggests a hot-water tubing to the top of the injection layer, the decrease in temperature with a shorter tubing is only one to three degree Celsius, the worst being a hot-water tubing of only about 300 m for $CO_2$ injection close to 3500 m (see Table 1 of FIG. 3). This suggests that a compromise may be made with a shorter tubing if one prefers to reduce capital cost of completions.

For numerical results of Table 1, OLGA was used, the commercial multiphase pipe-flow simulator from Schlumberger. Unlike what has been presented so far, temperature evolution of temperature can be computed for each component of the completion with respect to distance along the well bore. There may be a tubing, an annular fluid, a casing surrounded by cement and then the formation, and heat transfer among them are included.

OLGA is a three-fluid model. The three fluids are phases and are oleic, aqueous, and gas entrained with the droplets of either of the liquid phases. The simulator can include interphase mass transfer. Governing conservation equations are continuity, momentum, and a consolidated single energy equation, all phases having the same temperature at a given position. For the compressible phase, an equation of state is needed. OLGA takes the formations and surrounding completion fluids as tubing with composite wall layers. Table 2 lists the thermal properties of the system components that were used in the model. The input for $CO_2$ is based on surface condition. Note that the properties are slightly different from those used in the macroscopic calculations, since the latter was based on approximate average properties. The general conclusions derived from either procedure is approximately the same.

OLGA has two options for modeling $CO_2$ injection wells. The first option is the single component module with pressure/enthalpy flash for pure $CO_2$ in the system and the Span-Wagner equation of state (EoS). The second option is through compositional tracking module with pressure-enthalpy flash using a cubic plus association equation of state, when $CO_2$ contains impurities or additional fluids besides $CO_2$ need to be included. In this study, the second option was adopted to model annular heating of injected $CO_2$ via hot water injection in the annulus.

In reservoirs of finite extent, continued injection of $CO_2$ without concomitant fluid production results in a steady growth in average reservoir pressure. A logarithmic growth in time for pressure is expected at the wellbore for uniform displacement, which at some point will cross the injection limit set by fracture criteria. At the stated flow rate prescribed by Eq. 1, the flow rate ratio of water to $CO_2$ is $$\frac{m_w/\rho_w}{m_C/\rho_C} = \frac{1}{2}\frac{\mu_C}{\mu_w}, \tag{4}$$

which is about one-tenth. The average pressure for a finite reservoir with water production increases at 90% of the case when no water is produced, thus possibly increasing the storage potential by 10%. For a carbon tax of $40 per tonne of $CO_2$, this amounts to $4 million dollars a year. The true benefit is limited by near well-bore injectivity and the resulting 10% decrease in temperature increase via heating. Nevertheless, it is clear that annual benefit in total with proposed disclosure is likely to be a few million dollars.

In one example embodiment, a method is disclosed. The method may comprise obtaining a quantity of carbon dioxide for processing and heating the carbon dioxide to a specified temperature. The method may also comprise transferring the heated carbon dioxide to a transfer arrangement and transferring the heated carbon dioxide to an underground reservoir through use of the transfer arrangement.

In another example embodiment, the method may be performed wherein the transfer arrangement is at least one pump.

In another example embodiment, the method may be performed wherein the heating the carbon dioxide includes a solar preheating of the carbon dioxide at a surface elevation.

In another example embodiment, the method may be performed wherein the solar preheating is one of a solar radiation a solar photovoltaic electric heating.

In another example embodiment, the method may be performed wherein an injection well is used to perform at least a portion of the heating of the carbon dioxide to the specified temperature.

In another example embodiment, the method may be performed wherein the injection well has, at least in part, insulated tubing carrying a fluid.

In another example embodiment, the method may be performed wherein the fluid is a brine.

In another example embodiment, the method may be performed wherein the injection well and the tubing descend to a specified depth for heating a fluid from the injection well to heat the carbon dioxide.

In another example embodiment, the method may be performed wherein the heating of the carbon dioxide and a production of the fluid from the injection well to heat the carbon dioxide are simultaneous.

In another example embodiment, the method may be performed wherein surface mounted heat exchangers are used to at least perform a portion of the heating of the carbon dioxide.

In another example embodiment, an arrangement is disclosed comprising a storage device for containing a quantity of carbon dioxide and a heating device configured to take at least a portion of the quantity of carbon dioxide and heat the carbon dioxide to a specified temperature. The arrangement may also comprise a control system configured to monitor a process of the heating of the carbon dioxide to the specified temperature and an injection system to inject the heated carbon dioxide into a reservoir.

In another example embodiment, the arrangement may be configured wherein the reservoir is an underground reservoir.

In another example embodiment, the arrangement may be configured wherein the heating device at least includes a surface mounted heat exchanger.

In another example embodiment, the arrangement may be configured wherein the heating device at least includes a solar arrangement.

In another example embodiment, the arrangement may further comprise an injection well to at least partially heat the carbon dioxide.

In another example embodiment, the arrangement may be configured wherein the injection well carries a fluid used for heating the carbon dioxide.

In another example embodiment, the arrangement may further comprise a tubing to carry the fluid used for heating the carbon dioxide.

In another example embodiment, the arrangement may be configured wherein the tubing is insulated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method, comprising:
obtaining a quantity of carbon dioxide for processing;
heating the carbon dioxide from a below ambient temperature to a specified temperature, the heating including a preheating of the carbon dioxide at a surface elevation by solar radiation;
transferring the heated carbon dioxide to a transfer arrangement; and
transferring the heated carbon dioxide to an underground reservoir through use of the transfer arrangement.

2. The method according to claim 1, wherein the transfer arrangement is at least one pump.

3. The method according to claim 1, wherein an injection well is used to perform at least a portion of the heating of the carbon dioxide to the specified temperature.

4. The method according to claim 3, wherein the injection well has, at least in part, insulated tubing carrying a fluid.

5. The method according to claim 4, wherein the fluid is a brine.

6. The method according to claim 4, wherein the injection well and the insulated tubing descend to a specified depth for heating a fluid from the injection well to heat the carbon dioxide.

7. The method according to claim 6, wherein the heating of the carbon dioxide and a production of the fluid from the injection well to heat the carbon dioxide are simultaneous.

8. The method according to claim 1, wherein surface mounted heat exchangers are used to at least perform a portion of the heating of the carbon dioxide.

9. The method according to claim 1 wherein the preheating of the carbon dioxide further comprises flowing water at a temperature above that of the carbon dioxide upward with the carbon dioxide, the water cooling by the heating of the carbon dioxide.

10. An arrangement, comprising:
a storage device for containing a quantity of carbon dioxide;
a heating device configured to take at least a portion of the quantity of carbon dioxide for heating the carbon dioxide from a below ambient temperature to a specified temperature, the heating including a preheating of the carbon dioxide at a surface elevation by solar radiation;
a control system configured to monitor a process of the heating of the carbon dioxide to the specified temperature; and
an injection system to inject the heated carbon dioxide into a reservoir.

11. The arrangement according to claim 10, wherein the reservoir is an underground reservoir.

12. The arrangement according to claim 10, wherein the heating device at least includes a surface mounted heat exchanger.

13. The arrangement according to claim 10, further comprising:
an injection well to at least partially heat the carbon dioxide.

14. The arrangement according to claim 13, wherein the injection well carries a fluid used for heating the carbon dioxide.

15. The arrangement according to claim 14, further comprising a tubing to carry the fluid used for heating the carbon dioxide.

16. The arrangement according to claim 15, wherein the tubing is insulated.

\* \* \* \* \*